United States Patent [19]
Hine

[11] Patent Number: 4,749,330
[45] Date of Patent: Jun. 7, 1988

[54] TRANSPORT MECHANISM

[76] Inventor: Derek L. Hine, 5 Hawk View, Portola Valley, Calif. 94025

[21] Appl. No.: 863,084

[22] Filed: May 14, 1986

[51] Int. Cl.⁴ .............................................. B25T 9/06
[52] U.S. Cl. ................................ 414/744 A; 414/752; 414/917; 74/98; 74/103; 74/469; 901/25
[58] Field of Search ............... 414/744 B, 744 A, 752, 414/733, 917; 901/25; 74/98, 103, 469; 33/25.1, 25.3, 441

[56]  References Cited
U.S. PATENT DOCUMENTS 3,750,490  8/1973  Fisher ................................. 74/469
4,299,533  11/1981  Ohnaka ......................... 414/733 X
4,584,045  4/1986  Richards ......................... 414/222 X Primary Examiner—Robert J. Spar
Assistant Examiner—Donald W. Underwood

[57]  ABSTRACT

A transport mechanism for silicon wafers comprises an elongate four arm linkage and a wafer support arm which is secured to the linkage through a gearing system. One of the short arms of the linkage is fixed, and as the linkage is rotated, the gearing system produces a different motion in the support arm. Preferably pinion gears are secured to the ends of the long arms and engage a pinion gear secured to one end of the support arm, so as to produce linear motion of a wafer placed on the support arm.

6 Claims, 1 Drawing Sheet

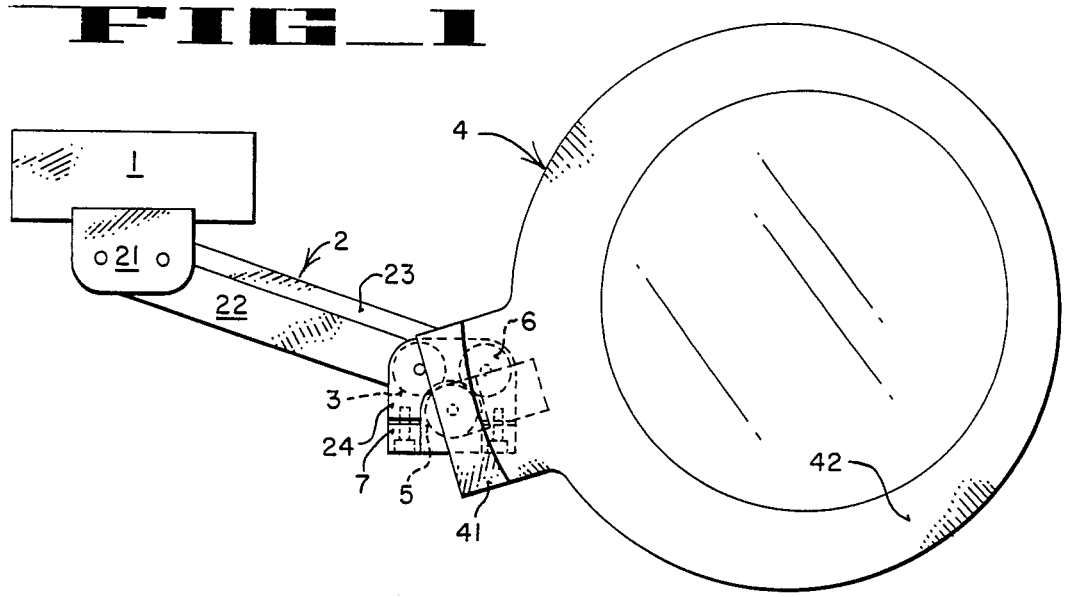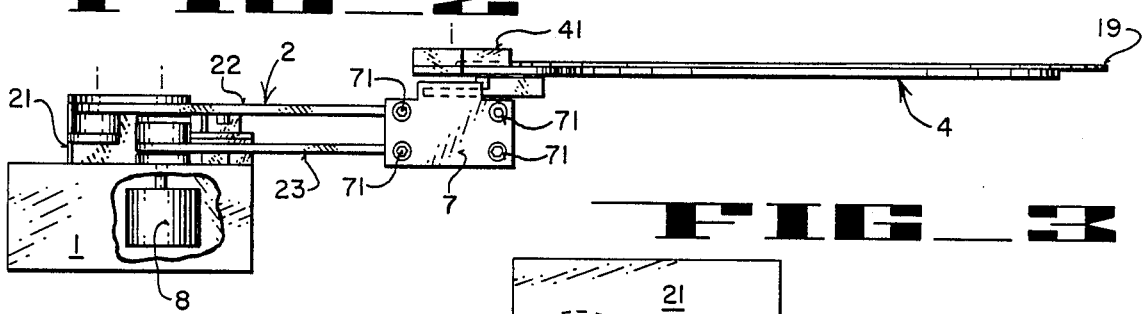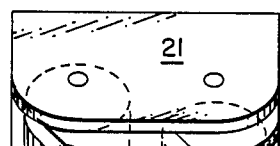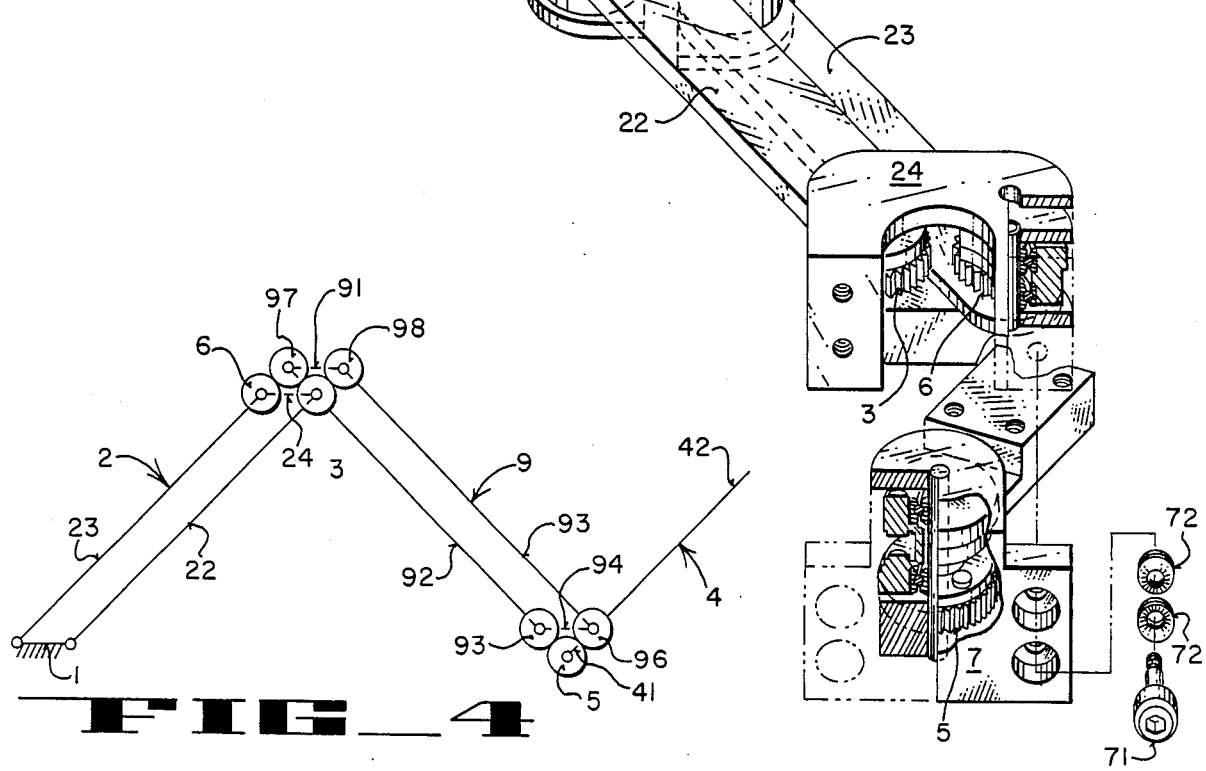

TRANSPORT MECHANISM

BACKGROUND OF THE INVENTION

1. Field of the Invention

This invention relates to apparatus for transporting silicon wafers or the like, and methods of using such apparatus.

2. Introduction to the Invention

In the manufacture of solid state electronics devices, silicon wafers are moved between different work stations, generally in cassettes which hold a number of wafers stacked one above the other in horizontal pockets, each pocket being in the form of a generally U-shaped horizontal groove into which a wafer can be placed. Careful handling of the wafers is essential; in particular insertion and extraction of wafers into and from cassettes require a linear motion in order to minimize damage to the wafers and the production of particulate contaminants. In many cases, it is desirable that the wafer should have a known orientation at the work station, and hence also a known orientation in the cassette.

Currently used transport mechanisms for silicon wafers include belt transports and air tracks, but these mechanisms have been criticized as likely sources of particles which can contaminate the wafers. U.S. Pat. Nos. 4,433,951 and 4,483,654 (Koch and Peterson, assigned to Lam Research Corporation), the disclosures of which are incorporated herein by reference, describe a transport mechanism in which the rotational motion of a support arm is transmitted through a series of gears to a workpiece arm shaft having one end rotatably secured to the support arm, so that rotation of the support arm effects linear motion (or other predetermined motion) of a workpiece placed at the other end of the workpiece arm shaft.

SUMMARY OF THE INVENTION

I have discovered an improved transport mechanism which makes use of a combination of (a) a multi-arm linkage which can be caused to rotate about a fixed base and (b) a support arm which is secured to the linkage through (c) a gearing system, so that, when the linkage is rotated, the rotational movement of the linkage results in a related but different rotational movement of the support arm. In this way, a silicon wafer (or other load) placed on the support arm can be transported along a predetermined non-circular, preferably linear, path which depends upon the lengths of the arms and the gearing system.

The linkage preferably comprises two long arms each having a first length, and two short arms which join the ends of the long arms and each of which has a second length which is less than the first length, eg. from 0.1 to 0.5 times the first length; the four arms are rotatably secured to each other, and one of the short arms is fixed relative to a base. When the three rotatable arms are rotated (for example by means of a motorized driving shaft coaxial with the pivot point between one of the long arms and the fixed short arm), the area enclosed by the arms (typically a parallelogram) changes. If the second, third, fourth and support arms rotate in different (but parallel) planes about pivots which do not extend into adjacent planes of rotation, the four arm linkage can be rotated through two extreme positions in each of which all the pivot points between the arms are in a straight line. The arms of the linkage can be straight, but need not be, and the term "arm" is used herein in a broad sense to include any physical structure which will permit the desired operation of the apparatus. For example, the fixed arm can be provided by two pillars which are mounted on the base to provide fixed pivot points for the long arms, in which case the base and the pillars together provide the short fixed arm.

The gearing system which connects the linkage and the support arm can be very simple, and preferably comprises (a) a first pinion gear which is secured to one of the rotatable arms and (b) a second pinion gear which is secured to the support arm and which is maintained in engagement with the first pinion gear as the rotatable arms of the linkage are rotated. The first pinion gear is preferably secured to one of the long arms at the end thereof remote from the fixed short arm. The second pinion gear is preferably secured to the support arm at one end thereof. The first and second pinion gears are preferably of the same size, so that rotation of the second arm results in an equal rotation of the support arm but in the opposite direction. This will result in linear motion of that section of the support arm (and/or of a wafer placed on the support arm) whose distance from the pivot point of the support arm is equal to the distance between the pivot points of each of the long arms. The linear motion passes through a point which is close to the pivot point between the first arm and the long arm carrying the pinion gear, but offset from that pivot point by a distance equal to the gear offset.

When the linkage is rotated through a position in which all the pivot points between the arms are in a straight line, or close to such a position, the linkage tends to become unstable and positioning of the support arm tends to become less accurate. In a preferred embodiment of the invention, this tendency is controlled by using a gearing system in which a gear on the support arm is driven by gears on at least two of the rotatable arms of the linkage. Preferably first and third pinion gears (which must be of the same size) are secured to the long arms at the respective ends thereof remote from the fixed short arm, and a second pinion gear is secured to the support arm and is maintained in engagement with the first and third pinion gears as the linkage is rotated. Preferably the second pinion gear is of the same size as the first and third pinion gears, so that linear motion of the support arm is obtained.

If desired, a similar gearing system, but without a support arm, can be used to stabilize the linkage at the fixed arm.

With a simple support arm, the transport of a wafer (or like object) along a defined, preferably linear, path will be accompanied by a defined degree of rotation. In some cases this is not a problem; in other cases, it is valuable if the wafer can be delivered in a different orientation (or close to it), so that the step of orienting the wafer at the work station is eliminated or made quicker and cheaper. This desirable result can be achieved by using a wafer support arm which is an auxiliary four arm linkage comprising one arm which is in a fixed position relative to the travelling short arm of the main linkage. If the auxiliary four arm linkage is identical to the main linkage, rotation of the wafer can be eliminated entirely. If the auxiliary linkage is different, then there will be a predictable degree of rotation which is less than that with a simple support arm.

The support arm can if desired comprise two or more auxiliary linkages successively connected through each other to the main linkage in the same way as is described above, in order to provide linear (or other predictable) motion over longer distances. However, care must be taken to ensure that the arm is sufficiently strong and rigid.

The gear on the support arm must be maintained in engagement with the gear or gears on the linkage. This is preferably achieved by spring loading the gears into each other or by using other known anti-backlash methods, which helps to make the apparatus more stable and to eliminate or reduce backlash.

BRIEF DESCRIPTION OF THE DRAWING

The invention is illustrated in the accompanying drawing, in which

FIG. 1 is a plan view of apparatus of the invention,
FIG. 2 is a side view of the apparatus of FIG. 1,
FIG. 3 is a perspective view, partly cut away, of part of the apparatus of FIG. 1, and
FIG. 4 is a diagrammatic view of another apparatus of the invention in which the support arm comprises an auxiliary four arm linkage.

DETAILED DESCRIPTION OF THE INVENTION

A preferred embodiment of the invention is an apparatus which comprises
(1) a base,
(2) a four arm linkage comprising
  (a) a first arm which is fixed relative to the base and which has a first end and a second end,
  (b) a second arm which is substantially longer than the first arm and which has a near end and a far end, the near end being rotatably secured to the first end of the first arm;
  (c) a third arm which is of the same length as the second arm and which has a near end and a far end, the near end being rotatably secured to the second end of the first arm, and
  (d) a fourth arm which is of the same length as the first arm and which has a first end rotatably secured to the far end of the second arm and a second end rotatably secured to the far end of the first arm;
(3) a first pinion gear which is secured to the second arm at the far end thereof;
(4) a wafer support arm which has a pivot end and a wafer support section, the wafer support section being adapted to carry a silicon wafer;
(5) a second pinion gear which is secured to the wafer support arm at the pivot end thereof and which is maintained in engagement with the first pinion gear as the second arm is rotated relative to the first arm;

whereby, when a wafer is placed on the wafer support arm and the second arm is rotated relative to the first arm, the wafer is transported along a linear path.

Referring now to FIGS. 1-3 of the drawing, these illustrate an apparatus which comprises a base 1; a four arm linkage 2 which comprises a first short arm 21 which is fixed to the base, a second long arm 22, a third long arm 23, and a fourth short arm 24; and a motor 8 for rotating the linkage about the base. The arms and the pivots between them are arranged so that the arms rotate in parallel but different planes. Secured to the end of arm 22 is pinion gear 3, and secured to the end of arm 23 is identical pinion gear 6. Wafer support arm 4 has a pivot end 41 and a wafer support section 42 which can carry a silicon wafer 19 (shown in FIG. 2 only). Secured to the pivot end 41 is a pinion gear 5 which is identical to pinion gears 3 and 6. The pinion gear 5 is rotatably mounted within a bracket 7 and is spring-loaded into engagement with pinion gears 3 and 6 by means of shoulder screws 71 and Belleville springs 72 which secure the bracket 7 to the short arm 24. Alternative means for springloading the pinion gears into engagement can of course be used.

Referring now to FIG. 4, this shows a four arm linkage 2 and a support arm 4 as in FIGS. 1-3 with an auxiliary four arm linkage 9 between linkage 2 and support arm 42. The auxiliary linkage comprises short arms 91 and 94 and long arms 92 and 93. Short arm 91 is maintained in a fixed position relative to short arm 24 by means of identical pinion gears 97 and 98 which are maintained in engagement with pinion gears 6 and 3. Arms 92 and 93 are secured to identical pinion gears 93 and 96 which engage the pinion gear 5 secured to the support arm 4.

I claim:

1. Apparatus for transporting a silicon wafer along a linear path from a first position to a second position, which apparatus comprises:
(1) a base,
(2) a four arm linkage comprising
  (a) a first arm which is fixed relative to the base and which has a first end and a second end,
  (b) a second arm which is substantially longer than the first arm and which has a near end and a far end, the near end being rotatably secured to the first end of the first arm;
  (c) a third arm which is of the same length as the second arm and which has a near end and a far end, the near end being rotatably secured to the second end of the first arm; and
  (d) a fourth arm which is of the same length as the first arm and which has a first end rotatably secured to the far end of the second arm and a second end rotatably secured to the far end of the first arm;
(3) a first pinion gear which is secured to the second arm at the far end thereof;
(4) a wafer support arm which has a pivot end and a wafer support end, the wafer support end being adapted to carry a silicon wafer;
(5) a second pinion gear which is secured to the wafer support arm at the pivot end thereofand which is maintained in enagement with the first pinion gear as the second arm is rotated relative to the first arm; and
(6) a third pinion gear which is secured to the third arm at the far end thereof and which is also maintained in engagement with the second pinion gear as the second arm is rotated relative to the first arm;

whereby, when a wafer is placed on the wafer support arm and the second arm is rotated relative to the first arm, the wafer is transported along a linear path.

2. Apparatus according to claim 1 wherein the second, third, fourth and wafer support arms rotate in different planes about pivots which do not extend into adjacent planes of rotation, whereby the four arm linkage can be rotated through two extreme positions in each of which all the pivot points between the arms are in a straight line.

3. Apparatus according to claim 1 which comprises means for rotating the second arm.

4. Apparatus according to claim 1 wherein the wafer support arm is an auxiliary four arm linkage comprising
(a) an auxiliary first arm which has a first arm which has first end and a second end, and which is in a fixed position relative to the second arm,
(b) an auxiliary second arm which has a near end and a far end, the near end being rotatably secured to the first end of the auxiliary first arm,
(c) an auxiliary third arm which is of the same length as the auxiliary second arm, and which has a near end and a far end, the near end being rotatably secured to the second end of the auxiliary first arm, and
(d) an auxiliary fourth arm which is of the same length as the auxiliary first arm and which has a first end rotatably secured to the far end of the second arm and a second end rotatably secured to the wafer support end of the wafer support arm,
whereby when a wafer is placed on the wafer support arm and the second arm is rotated relative to the first arm, the wafer is transported along a linear path without rotational motion.

5. A method of transporting a silicon wafer, which method comprises placing the wafer on the wafer support section of an apparatus as defined in claim 1 and rotating the four arm linkage.

6. Apparatus according to claim 1 wherein the second pinion gear is mounted within a bracket, and the bracket is secured to the fourth arm so that the second pinion gear is spring-loaded into engagement with the first and third pinion gears.

* * * * *